(12) United States Patent
Okamura et al.

(10) Patent No.: US 6,197,868 B1
(45) Date of Patent: *Mar. 6, 2001

(54) PNEUMATIC TIRE

(75) Inventors: Nobuyuki Okamura; Masahiro Hojo, both of Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/187,407

(22) Filed: Nov. 6, 1998

Related U.S. Application Data

(63) Continuation-in-part of application No. 08/998,551, filed on Dec. 24, 1997.

(30) Foreign Application Priority Data

| Mar. 11, 1997 | (JP) | 9-56388 |
| May 26, 1997 | (JP) | 9-135427 |
| Nov. 6, 1997 | (JP) | 9-304493 |

(51) Int. Cl.$^7$ ..................................... C08K 3/00
(52) U.S. Cl. ............ 524/492; 524/493; 524/495; 525/332.6
(58) Field of Search .................. 524/492, 493, 524/495; 525/332.6

(56) References Cited

U.S. PATENT DOCUMENTS 5,939,493 * 8/1999 Hojo ................................. 525/332.6

FOREIGN PATENT DOCUMENTS

| 1 054 051 | 2/1964 | (GB). |
| 1 288 616 | 9/1972 | (GB). |
| 47-9488 | 5/1972 | (JP). |

OTHER PUBLICATIONS

Rubber and Chemistry and Technology, Reactive Compounds For Effective Utilization of Silica, vol., 67, pp. 672–686.

Rubber and Chemistry and Technology, Studies on Cure Synergism—Part I: Effect of Bis(Diisopropyl) Thiophosphoryl disulfide and Thiazole–Based Accelerators in the Vulcanization of NR, vol. 62, pp. 569–584.

* cited by examiner

Primary Examiner—Edward J. Cain
(74) Attorney, Agent, or Firm—Sughrue, Mion, Zinn, Macpeak & Seas, PLLC

(57) ABSTRACT

A pneumatic tire having a tread layer. A rubber composition of the tread layer includes a specific diene-based rubber component, and either a specific zinc dithiophosphate vulcanization accelerator, or a specific zinc dithiophosphate vulcanization accelerator and a benzothiazole vulcanization accelerator. The zinc dithiophosphate vulcanization accelerator is contained in an amount of 0.2 to 5.0 parts by weight per 100 parts by weight of the rubber component. A molar amount of the benzothiazole vulcanization accelerator is one-half or more of a molar amount of the zinc dithiophosphate vulcanization accelerator. Further, the rubber composition contains a white filler in an amount of 15 parts by weight or more per 100 parts by weight of the rubber component. Produceability of the pneumatic tire is excellent, and a low heat build-up performance thereof is improved without any adverse effects on gripping performance.

18 Claims, No Drawings

PNEUMATIC TIRE

This Application is a Continuation-in-Part of Ser. No. 08/998,551 filed Dec. 24, 1997.

BACKGROUND OF THE INVENTION

1. Field of the Invention

The present invention relates to a pneumatic tire in whose tread portion a white filler is used, and more particular, to technology for improving the produceability of pneumatic tires.

2. Description of the Related Art

In recent years, research has been carried out on reducing the rolling resistance of tires in order to reduce the fuel costs for automobiles as one of the demands made by society for the conservation of energy and the conservation of resources. The rolling resistance of a tire can be reduced by lowering the heat build-up property of the tire. This may lead to a decrease in the temperature of a tire which is being traveled on, and may improve the durability of a tire, especially a large-sized tire.

It is well known that using a rubber composition having low hysteresis loss as a tread rubber is good for decreasing the heat build-up property of a tire. However, when a rubber composition having low hysteresis loss is used as a tread rubber, the road surface gripping properties, particularly the gripping properties on wet road surfaces, tend to deteriorate, which is not preferable from the standpoint of safety. There is thus the demand for a tire which exhibits both a good low heat build-up property and good gripping properties.

However, in most cases, rubber compositions in which a white filler is compounded have a slow vulcanization speed, which results in problems with regard to vulcanization produceability. In particular, when attempts are made to use such a rubber composition in the tread of a pneumatic tire, it is often the case that the tread portion is the thickest gauge portion of an unvulcanized tire, and the vulcanization produceability is often determined by the vulcanization speed of this portion. Therefore, the vulcanization produceability is sacrificed. Further, when attempts are made to carry out vulcanization sufficiently all the way through to the inner portion of the tread, there arises the problem that, due to the poor thermal conductivity, the surface of the tread is overcured and the properties thus deteriorate.

A rubber composition, in which natural rubber or butadiene rubber is the main rubber component, is often used in particular in tires in which a low heat build-up property is important and in large tires in which durability is important. However, the properties deteriorate greatly when such rubber compositions are overcured. A tire tread rubber composition which has a low heat build-up property, a fast vulcanization speed, and little deterioration of properties when overcured has been desired.

Various studies have been conducted with regard to these problems. *Rubber Chemistry and Technology*, Vol. 67, pp. 672–686 discusses an improvement in the properties of a rubber composition due to the combined use of silica and a thiophosphoryl compound. However, there is no disclosure therein of the specific metal salt which is used in the present invention, no disclosure relating to application to tires, and no suggestion nor study of properties required of tires such as those described above, i.e., low heat build-up property, high gripping performance, good produceability, and the like.

Further, U.S. Pat. No. 3,426,003 discloses the use of zinc dithiophosphate and a thiuram compound as a combination of vulcanizing accelerators for butyl rubber. However, in U.S. Pat. No. 3,426,003, natural rubber or butadiene rubber is not the main rubber component, and there is no disclosure of a white filler which is essential in the present invention.

British Patent No. 1,288,616 discloses improving discoloration by the combined use of zinc dithiophosphate and a white filler, but does not include any study nor suggestion of the various properties required of a tire such as those described above.

Japanese Patent Application (JP-A) No. 47-9488 discloses a method of vulcanizing a rubber compound formed from a diene-based rubber component, a specific diradical dithiophosphate, a known vulcanization accelerator, and sulfur. The obtained vulcanizate has a superior resistance to heat aging. However, this rubber compound includes substantially no white filler such as silica. Further, no studies have been carried out on tires using such a rubber compound. JP-A-47-9488 includes no recitations relating to, nor even any suggestion of, the properties required of a tire such as described above.

SUMMARY OF THE INVENTION

The present invention has been achieved in view of the above facts, and an object of the present invention is to provide a pneumatic tire having high levels of both low heat build-up property and gripping performance, and having good produceability.

The present inventors conducted extensive studies on polymers and various types of ingredients which are compounded into tread rubber, and found that by the following means the above object can be achieved and the present invention can be completed.

A pneumatic tire of the present invention has a tread, wherein a rubber composition of the tread layer comprises: a diene-based rubber component containing a rubber selected from the group consisting of styrene-butadiene rubber (SBR), butyl rubber (IIR), and ethylene-propylene rubber (EPDM) in an amount of less than 50 parts by weight in 100 parts by weight of the diene-based rubber component; a white filler in an amount of 15 parts by weight or more per 100 parts by weight of the rubber component; and a zinc dithiophosphate which is a vulcanization accelerator represented by following general formula (I) in an amount of 0.2 to 5.0 parts by weight per 100 parts by weight of the rubber component:

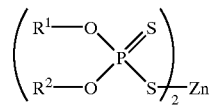

(I)

wherein $R^1$ and $R^2$ each independently represents an alkyl group having 1 to 10 carbon atoms which may be linear, branched, or cyclic, or an aryl group having 6 to 10 carbon atoms.

A pneumatic tire of the present invention has a tread, wherein a rubber composition of the tread layer comprises: a diene-based rubber component containing a rubber selected from the group consisting of styrene-butadiene rubber (SBR), butyl rubber (IIR), and ethylene-propylene rubber (EPDM) in an amount of less than 50 parts by weight in 100 parts by weight of the diene-based rubber component; a white filler in an amount of 15 parts by weight or more per 100 parts by weight of the rubber component; and at least two vulcanization accelerators, at least one of the vulcanization accelerators being a vulcanization accelerator represented by following general formula (I), and at least one of the other vulcanization accelerators being a vulcanization accelerator containing a benzothiazole unit, wherein the content of a zinc dithiophosphate which is the vulcanization accelerator represented by general formula (I) is 0.2 to 5.0 parts by weight per 100 parts by weight of the rubber component, and the molar amount of a unit of benzothiazole contained in the rubber composition is one-half or more of the molar amount of the vulcanization accelerator represented by general formula (I):

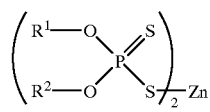

(I)

wherein $R^1$ and $R^2$ each independently represents an alkyl group having 1 to 10 carbon atoms which may be linear, branched, or cyclic, or an aryl group having 6 to 10 carbon atoms.

DETAILED DESCRIPTION OF THE INVENTION

Examples of the diene-based rubber component used in the rubber composition of the tread layer of the pneumatic tire of the present invention are natural rubber (NR) and synthetic rubbers, e.g., styrene-butadiene rubber (SBR), isoprene rubber (IR), butadiene rubber (BR), butyl rubber (including halogenated butyl rubber) (IIR), ethylene-propylene rubber (EPDM) and the like. In the present invention, the rubber composition must not include 50 or more parts by weight of SBR, IIR, and/or EPDM in 100 parts by weight of the diene-based rubber component. A single rubber component may be used, or a blend of two or more types of rubber components may be used. If SBR, IIR and/or EPDM are contained in an amount of 50 parts by weight or more, the low heat build-up property deteriorates greatly, and therefore, such amounts are not preferable. Further, from the standpoints of the low heat build-up property and durability, it is preferable that the total amount of NR, IR and BR in 100 parts by weight of the rubber component is 50 parts by weight or more.

The rubber composition of the tread layer of the pneumatic tire of the present invention must comprise 0.2 to 5.0 parts by weight, preferably 0.2 to 2.0 parts by weight, of the vulcanization accelerator represented by the above general formula (I) per 100 parts by weight of the rubber component. When the amount is less than 0.2 parts by weight, the effect of improving the vulcanization speed is low. When the amount exceeds 5.0 parts by weight, no further increase in the effect is seen, and thus, any addition above 5.0 parts by weight is uneconomical.

In the following general formula (I) representing the vulcanization accelerator used in the present invention, i.e., a zinc dithiophosphate, $R^1$ and $R^2$ each independently represents an alkyl group having 1 to 10 carbon atoms which may be linear, branched, or cyclic or an aryl group having 6 to 10 carbon atoms.

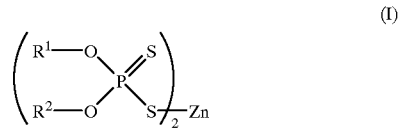

(I)

$R^1$ and $R^2$ each is preferably an alkyl group having 3 to 4 carbon atoms, such as the alkyl groups in the compounds expressed by the following formulae (II):

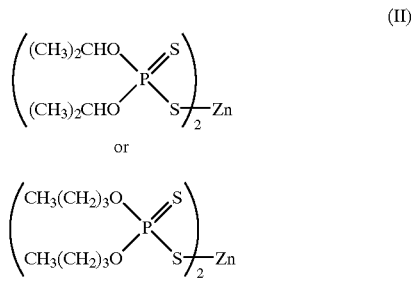

(II)

A zinc dithiophosphate having an alkyl group having 2 or less carbon atoms tends to show a decreased solubility to rubber. When a zinc dithiophosphate has an alkyl group having 5 or more carbon atoms, no further increase in the effect is seen. Thus, any alkyl group having more than 5 carbon atoms is uneconomical.

Examples of the vulcanization accelerator include zinc O,O'-dipropyldithiophosphate, zinc O,O'-diisopropyldithiophosphate, zinc O,O'-di-n-butyldithiophosphate, zinc O,O'-di-sec-butyldithiophosphate, zinc O,O'-di-t-butyldithiophosphate, zinc O,O'-diphenyldithiophosphate, and zinc O,O'-dicyclohexyldithiophosphate. Among these compounds, zinc O,O'-diisopropyldithiophosphate and zinc O,O'-di-n-butyldithiophosphate are preferable. The vulcanization accelerator can be used singly or as a mixture of two or more types.

In the present invention, a white filler must be contained in the rubber composition used in the tread of the pneumatic tire.

Examples of the white filler include silica, aluminum hydroxide, clay, talc, calcium carbonate, magnesium carbonate, and the like. To achieve high levels of both low heat build-up property and gripping performance, for example, silica or aluminum hydroxide may be used.

The white filler must be contained in an amount of 15 parts by weight or more, and preferably from 15 to 85 parts by weight, per 100 parts by weight of the rubber component. If the amount of the white filler is less than 15 parts by weight, the effects of improving the low heat build-up property and the gripping performance are insufficient. If the amount of the white filler exceeds 85 parts by weight, the viscosity of the rubber is excessively high and workability deteriorates. Thus, amounts less than 15 parts by weight and in excess of 85 parts by weight are not preferable. A single white filler may be used, or two or more types of white fillers may be used.

Carbon black may be used together with the white filler. However, in order to achieve high levels of both low heat build-up property and gripping performance, it is preferable that 40% by weight or more of the total amount of filler is white filler.

In the rubber composition of the present invention, components generally used in rubber compositions used in the treads of tires, such as zinc oxide, stearic acid, antioxidants, waxes, silane coupling agents, and vulcanizing agents, can suitably be comprised in combination with the above essential components within a range in which the effects of the present invention are not adversely affected.

In the present invention, a silane coupling agent is preferably used when silica is used as the white filler.

Examples of the silane coupling agent include bis(3-triethoxysilylpropyl)tetrasulfide, bis(2-triethoxysilylethyl)tetrasulfide, bis(3-trimethoxysilylpropryl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-nitropropyltrimethoxysilane, 3-nitropropyltriethoxysilane, 3-chloropropyltrimethoxysilane, 3-chloropropyltriethoxysilane, 2-chloroethyltrimethoxysilane, 2-chloroethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazole tetrasulfide, 3-triethoxysilylpropylbenzothiazole tetrasulfide, 3-triethoxysilylpropyl methacrylate monosulfide, 3-trimethoxysilylpropyl methacrylate monosulfide, γ-aminopropyltriethoxysilane, N-phenyl-γ-aminopropyltrimethoxysilane, and N-β-(aminoethyl)-γ-aminopropyltrimethoxysilane. Among these compounds, bis(3-triethoxysilylpropyl)tetrasulfide, 3-mercaptopropyltriethoxysilane, γ-aminopropyltriethoxysilane, N-phenyl-γ-aminopropyltrimethoxysilane, and N-β-(aminoethyl)-γ-aminopropyltrimethoxysilane are preferable.

Other examples of the silane coupling agent include bis(3-diethoxymethylsilylpropyl) tetrasulfide, 3-mercaptopropyldimethoxymethylsilane, 3-nitropropyldimethoxymethylsilane, 3-chloropropyldimethoxymethylsilane, dimethoxymethylsilylpropyl-N,N-dithiocarbamoyl tetrasulfide, and dimethoxymethylsilylpropylbenzothiazole tetrasulfide.

The amount of the silane coupling agent is preferably 1 to 15% by weight, and more preferably 5 to 12% by weight, of the amount of silica. When the amount of the silane coupling agent is less than 1% by weight, the coupling effect is small. When the amount exceeds 15% by weight, gel is formed. Therefore, such amounts are not preferable.

Examples of the vulcanizing agent include sulfur and donors of sulfur, which can be added in an amount of sulfur of 0.5 to 5.0 parts by weight, preferably 0.5 to 2 parts by weight, to 100 parts by weight of the rubber component. When the amount is less than 0.5 parts by weight, the breakage strength and abrasion resistance of the vulcanized rubber decrease. When the amount exceeds 5 parts by weight, the rubber elasticity tends to be inferior.

In one aspect of the present invention, the rubber composition of the tread layer of the pneumatic tire includes at least two vulcanization accelerators. At least one of the vulcanization accelerators is the vulcanization accelerator represented by general formula (I), and at least one of the other vulcanization accelerators is a vulcanization accelerator containing a benzothiazole unit. The molar amount of a unit of benzothiazole contained in the rubber composition is one-half or more of the molar amount of the vulcanization accelerator represented by general formula (I).

Preferable examples of vulcanization accelerators containing a benzothiazole unit include mercaptobenzothiazoles, alkylated mercaptobenzothiazoles, dibenzothiazolyl disulfides, bis(alkylated benzothiazolyl) disulfides, benzothiazolylsulfenamides, alkylated benzothiazolylsulfenamides, benthiazolylsulfenimides, alkylated benzothiazolylsulfenimides. Among these, more preferable examples include alkylated benzothiazolylsulfenamides and/or alkylated benzothiazolylsulfenimides.

Specific examples of the vulcanization accelerator containing a benzothiazole unit include, for example, mercaptobenzothiazole, 4-methylmercaptobenzothiazole, 4-ethylmercaptobenzothiazole, 2,2'-dithiobismercaptobenzothiazole, 2,2'-dithiobis(4-methylmercaptobenzothiazole), 2,2'-dithiobis(4-ethylmercaptobenzothiazole), N-tert-butyl-2-benzothiazolylsulfenamide, N-tert-butyl-2-(4-methylbenzothiazolylsulfenamide), N-tert-butyl-2-(4-ethylbenzothiazolylsulfenamide), N-cyclohexyl-2-benzothiazolylsulfenamide, N-cyclohexyl-2-(4-methylbenzothiazolylsulfenamide), N-cyclohexyl-2-(4-ethylbenzothiazolylsulfenamide), N-tert-butyl-2-benzothiazolylsulfenimide, N-tert-butyl-2-(4-methylbenzothiazolylsulfenimide), N-tert-butyl-2-(4-ethylbenzothiazolylsulfenimide), N-cyclohexyl-2-benzothiazolylsulfenimide, N-cyclohexyl-2-(4-methylbenzothiazolylsulfenimide), and N-cyclohexyl-2-(4-ethylbenzothiazolylsulfenimide). Among these, N-tert-butyl-2-benzothiazolylsulfenamide, N-cyclohexyl-2-benzothiazolylsulfenamide, N-tert-butyl-2-benzothiazolylsulfenimide, N-cyclohexyl-2-benzothiazolylsulfenimide, and the like are preferable.

When the molar amount of the unit of benzothiazole in the rubber composition is less than one-half of the molar amount of the vulcanization accelerator represented by general formula (I), there is only a slight improvement in the vulcanization rate, and vulcanization must be conducted for a long time. Therefore, there is only a slight improvement in produceability.

Combined use of a dithiophosphate type accelerator, which is not a zinc salt, and a benzothiazole type accelerator is reported in *Rubber Chemistry and Technology*, Volume 62, pages 569 to 584. According to this report, the optimum cure time is increased by the combined use, and this is opposite to the result of the present invention as can be understood from the examples described below. It is thought that the vulcanization time is lengthened in the aforementioned publication because the dithiophosphate used therein is not a zinc salt such as is used in the present invention. This lengthening of the vulcanization time is opposite the effect of the present invention.

The rubber composition in the present invention can be obtained by mixing the components using a mixing machine, such as a roller, an internal mixer, and a Banbury mixer. The rubber composition is used for a tire tread.

EXAMPLES

The present invention will be described in more detail with reference to the following examples. However, the present invention is not limited to these examples.

Various measurements were conducted in accordance with the following methods.

(1) Evaluation of Vulcanization Speed and Overcuring Resistance

The vulcanization speed and overcuring resistance were measured by using an MDR2000 manufactured by Flexsys Co.

For the vulcanization speed, t'90 was measured at 160° C. in accordance with ASTM D5289-95. The values were expressed as indices with the value of Comparative Example 1 being set to an index of 100. Lower values indicate that the vulcanization speed is faster and thus that produceability is better.

For the overcuring resistance, torque values at 190° C. after 2 minutes and after 20 minutes were measured, and the ratio thereof was expressed as a percent in accordance with the following formula. Values closer to 100 express that there are fewer variations in properties with respect to overcuring, and are thus better.

$$\text{overcuring resistance} = \frac{\text{torque value after 20 minutes}}{\text{torque value after 2 minutes}} \times 100 \ (\%)$$

(2) Evaluation of Low Heat Build-Up Property

For the low heat build-up property, the rebound resilience was measured by using a Dunlop-type tripsometer. The values were expressed as indices with the value of Comparative Example 1 being set to an index of 100. The higher the value, the harder it is for energy applied to the rubber to be changed into heat, which is preferable.

(Examples 1–4, Comparative Examples 1–2)

The components listed in following Table 1 were compounded in accordance with the formulations shown in Table 1 to form rubber compositions. The vulcanization speed, overcuring resistance, and low heat build-up resistance of each rubber composition were measured. The results are listed in Table 1.

TABLE 1

|  | Comparative Examples | | Examples | | | |
| --- | --- | --- | --- | --- | --- | --- |
|  | 1 | 2 | 1[8] | 2 | 3[8] | 4 |
| formulation (parts by weight) | | | | | | |
| natural rubber | 100 | — | 100 | 100 | 100 | 100 |
| SBR[1] | — | 100 | — | — | — | — |
| silica[2] | 50 | 50 | 50 | 50 | 50 | 50 |
| silane coupling agent[3] | 5 | 5 | 5 | 5 | 5 | 5 |
| aromatic oil | 5 | 5 | 5 | 5 | 5 | 5 |
| antioxidant[4] | 1 | 1 | 1 | 1 | 1 | 1 |
| stearic acid | 2 | 2 | 2 | 2 | 2 | 2 |
| zinc oxide | 3 | 3 | 3 | 3 | 3 | 3 |
| accelerator DIPDPZn[5] | — | 1 | 0.5 | 1 | 0.5 | 0.5 |
| accelerator TBBS[6] | 1 | — | 1 | — | 0.15 | — |
| accelerator DPG[7] | — | 0.2 | — | — | — | — |
| sulfur | 1 | 1 | 1 | 1 | 1 | 1 |
| properties | | | | | | |
| vulcanization speed (index) | 100 | 237 | 45 | 98 | 76 | 86 |
| overcuring resistance (%) | 84 | 141 | 87 | 102 | 93 | 92 |
| low heat build-up property (index) | 100 | 86 | 123 | 107 | 106 | 97 |

[1]SBR 1500 (manufactured by Japan Synthetic Rubber Co., Ltd.)
[2]Nipsil AQ (manufactured by Japan Silica Industries Co., Ltd.)
[3]Si69 (manufactured by Degussa Co., Ltd.)
[4]N-(1,3-dimethylbutyl)-N'-phenylphenylenediamine
[5]zinc O,O'-diisopropyldithiophosphate
[6]N-t-butyl-2-benzothiazolylsulfenamide
[7]diphenylguanidine
[8]TBBS/DIPDPZn (mol ratio) of Example 1 is 3.59 and of Example 3 is 0.54.

As can be seen from Table 1, by using the rubber components, white filler, and vulcanization accelerators of the present invention, a rubber composition having rapid vulcanization speed, high overcuring resistance, and low heat build-up property can be obtained. Thus, a tire having good properties can be manufactured with good produceability.

Pneumatic radial tires for passenger vehicles (size 195/60R15) and heavy-duty pneumatic radial tires for trucks and buses (size 1000R20), whose treads were the six types of rubber compositions in Table 1 (i.e., Examples 1 through 4 and Comparative Examples 1 and 2), were test-manufactured. The tires of the Examples and the tires of the Comparative Examples were compared, and it was found that each of the Example tires had a shorter vulcanization time and a smaller rolling resistance. The tires of Examples 1 and 3 had shortened vulcanization times, and the rolling resistances thereof were markedly improved.

In accordance with the present invention, the produceability of a pneumatic tire having an improved low heat build-up performance can be improved without adversely affecting the gripping performance.

What is claimed is:

1. A pneumatic tire having a tread, wherein a rubber composition of the tread layer comprises:

a diene-based rubber component containing a rubber selected from the group consisting of styrene-butadiene rubber (SBR), butyl rubber (IIR), and ethylene-propylene rubber (EPDM) in an amount of less than 50 parts by weight in 100 parts by weight of the diene-based rubber component;

a white filler in an amount of 15 parts by weight or more per 100 parts by weight of the rubber component; and a zinc dithiophosphate which is a vulcanization accelerator represented by following general formula (I) in an amount of 0.2 to 5.0 parts by weight per 100 parts by weight of the rubber component:

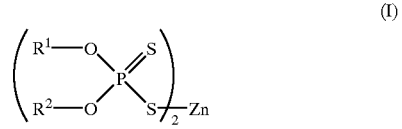

(I)

wherein $R^1$ and $R^2$ each independently represents an alkyl group having 1 to 10 carbon atoms which may be linear, branched, or cyclic, or an aryl group having 6 to 10 carbon atoms.

2. A pneumatic tire according to claim 1, wherein a total amount of natural rubber, isoprene rubber, and butadiene rubber in the rubber component is 50 parts by weight or more in 100 parts by weight of the rubber component.

3. A pneumatic tire according to claim 1, wherein the vulcanization accelerator represented by general formula (I) is a vulcanization accelerator expressed by either of the following formulae (II).

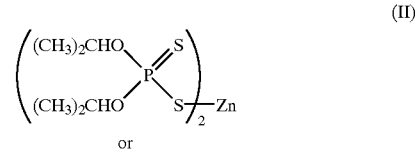

(II)

or

-continued

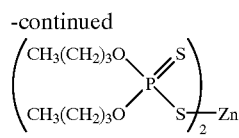

4. A pneumatic tire according to claim 1, wherein the white filler in the rubber composition is silica or aluminum hydroxide.

5. A pneumatic tire according to claim 1, wherein the amount of the white filler contained in the rubber composition is 15 to 85 parts by weight per 100 parts by weight of the rubber component.

6. A pneumatic tire according to claim 4, wherein a silane coupling agent is contained in the rubber composition in an amount of 1 to 15% by weight of the amount of silica.

7. A pneumatic tire according to claim 1, wherein the rubber composition comprises the vulcanization accelerator represented by general formula (I) in an amount of 0.2 to 2.0 parts by weight per 100 parts by weight of the rubber component.

8. A pneumatic tire according to claim 1, wherein the rubber composition further comprises carbon black as a filler, and the white filler is 40% by weight or more of the total amount of the fillers.

9. A pneumatic tire having a tread, wherein a rubber composition of the tread layer comprises:
  a diene-based rubber component containing a rubber selected from the group consisting of styrene-butadiene rubber (SBR), butyl rubber (IIR), and ethylene-propylene rubber (EPDM) in an amount of less than 50 parts by weight in 100 parts by weight of the diene-based rubber component;
  a white filler in an amount of 15 parts by weight or more per 100 parts by weight of the rubber component; and
  at least two vulcanization accelerators, at least one of the vulcanization accelerators being a vulcanization accelerator represented by following general formula (I), and at least one of the other vulcanization accelerators being a vulcanization accelerator containing a benzothiazole unit,
  wherein the content of a zinc dithiophosphate which is the vulcanization accelerator represented by general formula (I) is 0.2 to 5.0 parts by weight per 100 parts by weight of the rubber component, and
  the molar amount of a unit of benzothiazole contained in the rubber composition is one-half or more of the molar amount of the vulcanization accelerator represented by general formula (I):

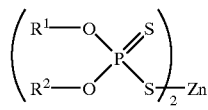

(I)

wherein $R^1$ and $R^2$ each independently represents an alkyl group having 1 to 10 carbon atoms which may be linear, branched, or cyclic, or an aryl group having 6 to 10 carbon atoms.

10. A pneumatic tire according to claim 9, wherein a total amount of natural rubber, isoprene rubber and butadiene rubber in the rubber component is 50 parts by weight or more in 100 parts by weight of the rubber component.

11. A pneumatic tire according to claim 9, wherein the vulcanization accelerator represented by general formula (I) is a vulcanization accelerator expressed by either of the following formulae (II).

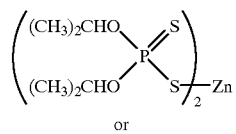

(II)

or

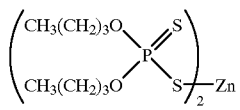

12. A pneumatic tire according to claim 9, wherein the white filler in the rubber composition is silica or aluminum hydroxide.

13. A pneumatic tire according to claim 9, wherein the amount of the white filler contained in the rubber composition is 15 to 85 parts by weight per 100 parts by weight of the rubber component.

14. A pneumatic tire according to claim 12, wherein a silane coupling agent is contained in the rubber composition in an amount of 1 to 15% by weight of the amount of silica.

15. A pneumatic tire according to claim 9, wherein the rubber composition comprises the vulcanization accelerator represented by general formula (I) in an amount of 0.2 to 2.0 parts by weight per 100 parts by weight of the rubber component.

16. A pneumatic tire according to claim 9, wherein the rubber composition further comprises carbon black as a filler, and the white filler is 40% by weight or more of the total amount of the fillers.

17. A pneumatic tire according to claim 9, wherein the vulcanization accelerator containing a benzothiazole unit is at least one compound selected from the group consisting of mercaptobenzothiazoles, dibenzothiazolyl disulfides, benzothiazolylsulfenamides and benzothiazolylsulfenimides.

18. A pneumatic tire according to claim 17, wherein the vulcanization accelerator containing a benzothiazole unit is at least one compound selected from the group consisting of alkylated mercaptobenzothiazoles, bis(alkylated benzothiazolyl) disulfides, alkylated benzothiazolylsulfenamides and alkylated benzothiazolylsulfenimides.

* * * * *